(12) United States Patent
Altmann

(10) Patent No.: US 12,676,272 B2
(45) Date of Patent: Jul. 7, 2026

(54) MANUALLY RESETTABLE SWITCH APPARATUS

(71) Applicant: Phoenix Contact GmbH & Co. KG, Blomberg (DE)

(72) Inventor: Matthias Altmann, Bad Pyrmont (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 342 days.

(21) Appl. No.: 18/271,637

(22) PCT Filed: Jan. 14, 2022

(86) PCT No.: PCT/EP2022/050730
§ 371 (c)(1),
(2) Date: Jul. 10, 2023

(87) PCT Pub. No.: WO2022/152837
PCT Pub. Date: Jul. 21, 2022

(65) Prior Publication Data

US 2024/0062978 A1 Feb. 22, 2024

(30) Foreign Application Priority Data

Jan. 18, 2021 (BE) .................................. 2021/5025

(51) Int. Cl.
*H01H 47/00* (2006.01)
*H01H 50/04* (2006.01)

(52) U.S. Cl.
CPC ........ *H01H 47/002* (2013.01); *H01H 50/048* (2013.01)

(58) Field of Classification Search
CPC .. H01H 47/002; H01H 47/004; H01H 47/005; H01H 47/00; H01H 9/548;

(Continued)

(56) References Cited

U.S. PATENT DOCUMENTS

| | | | | |
|---|---|---|---|---|
| 7,109,833 | B1 | 9/2006 | Pohl | |
| 2014/0211345 | A1* | 7/2014 | Thompson | B60L 53/68 335/11 |
| 2016/0042899 | A1 | 2/2016 | Zhou | |

FOREIGN PATENT DOCUMENTS

| | | | |
|---|---|---|---|
| DE | 102004045889 | A1 | 6/2005 |
| DE | 102015105370 | A1 | 10/2016 |

OTHER PUBLICATIONS

Authorized Officer: Serge Ledoux, International Search Report issued in PCT Application No. PCT/EP2022/050730, Mar. 18, 2022, 2 pp.

(Continued)

*Primary Examiner* — Bryan R Perez
(74) *Attorney, Agent, or Firm* — Kaplan Breyer Schwarz, LLP

(57) ABSTRACT

A manually resettable switch apparatus, which is controllable into a first or a second operating state, includes: a current path with an input terminal to which an input voltage can be applied, and an output terminal, a manually pluggable relay having a coil and a switching element which is switched into the current path when the relay is plugged in, a control and evaluation device which is designed to detect a defective operation of the switch apparatus and, in response thereto, to set the switch apparatus to the second operating state, and a detection device which is electrically connected to the control and evaluation device and is designed to signal to the control and evaluation device whether the relay is plugged in or unplugged. The control and evaluation device is further designed: i) to detect whether the relay has been unplugged after a detected defective operation and has been plugged in again after a predetermined time has elapsed, and if so, ii) to set the switch apparatus to the first operating state.

9 Claims, 2 Drawing Sheets

(58) Field of Classification Search
CPC . H01H 9/542; G05B 9/02; G06F 7/588; H02J 9/005; H02J 9/061
See application file for complete search history.

(56) References Cited

OTHER PUBLICATIONS

Authorized Officer: Nora Lindner, English Translation of International Preliminary Report on Patentability issued in PCT application No. PCT/EP2022/050730, Jul. 4, 2023, 5 pp.

Office Action issued on Apr. 28, 2026 in Chinese Patent Application No. 202280010165.X and English Translation thereof.

* cited by examiner

MANUALLY RESETTABLE SWITCH APPARATUS

FIELD

The invention relates to a manually resettable switch apparatus, which can be used, for example, in process control systems in the field of automation technology.

BACKGROUND

Electronic devices that are used in process control systems, for example, must be able to be reset into their normal operating state by means of an acknowledgement after they have been switched off as a result of a detected error. An acknowledgement or reset of an electronic device after the occurrence of an error can be done, for example, via a switch or pushbutton implemented on the device, via a separate reset input or, if the electronic device is connected to a bus system, via a software command which is generated, for example, by a higher-level controller (e.g. a PLC).

SUMMARY

It is now an object of the invention to create a manually resettable switch apparatus that can be quickly and easily reset into its normal operation after a fault-induced shutdown, even if the switch apparatus does not have a separate reset input or a reset switch. Particularly in the case of an electronic device that is housed in a very narrow housing, for example in a narrow terminal block housing, there is often no more space for a reset switch or a free terminal point that could be used as a reset input.

A core idea of the invention can be seen in providing a switch apparatus with a manual reset mechanism, which can be realized, for example, by means of a pullable or unpluggable and a re-insertable or re-pluggable relay and a circuit. The circuit serves in particular to monitor the pulling or unplugging and the reinsertion or re-plugging of the relay and to reset the switch apparatus into a normal operating state simply by unplugging and re-plugging the relay after it has been switched off due to a fault. The relay performs a dual function here: On the one hand, it functions as a switching device for opening and closing at least one current path of the switch apparatus, and on the other hand, it forms part of the reset mechanism.

The above-mentioned technical problem is solved by the features of claim 1. Advantageous further developments and embodiments are the subject of the dependent claims.

BRIEF DESCRIPTION OF THE DRAWINGS

The invention is explained in more detail below with reference to an example of an embodiment in conjunction with the accompanying drawings. Therein shows.

DETAILED DESCRIPTION

Figure 1:
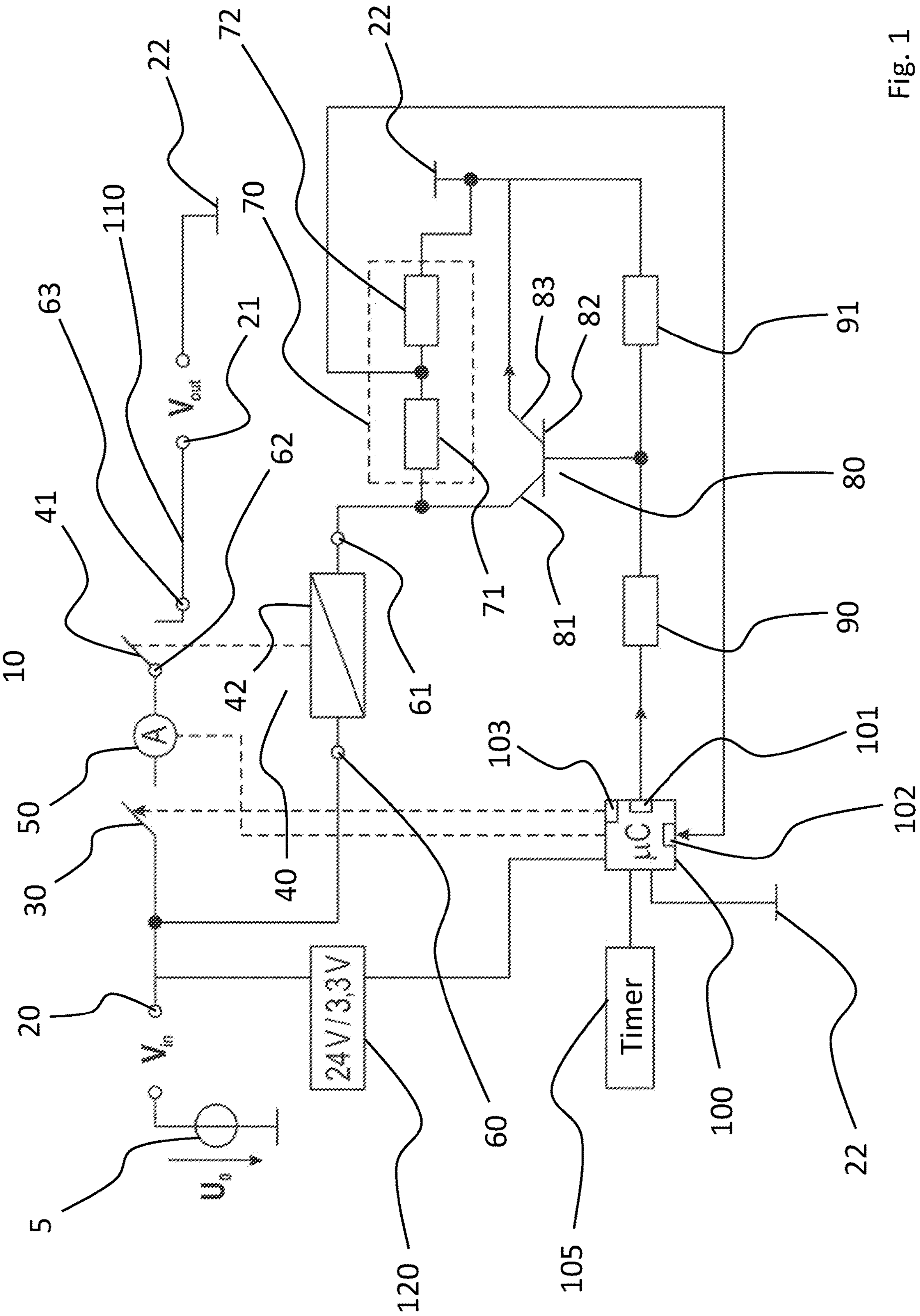
FIG. 1 an exemplary manually resettable switch apparatus.

FIG. 1 shows an exemplary manually resettable switch apparatus 10, which can be of single-phase or multi-phase design in order to be able to connect an electrical load (not shown), which can be connected on the output side, to a supply energy, which can be applied on the input side, or to disconnect it from the latter. The switch apparatus 10, which is shown merely by way of example and is explained below, is designed as a single-phase switch apparatus, which can be controlled, for example, into a first or second operating state. The first operating state may represent a normal, fault-free operation, while the second operating state may represent, for example, the shutdown mode triggered as a result of a fault condition.

For example, the switch apparatus 10 has a ground terminal 22 and an input terminal 20 to which an input voltage can be applied. According to the exemplary embodiment, a power supply device 5 may be connected to the input terminal 20 and the ground terminal 22. For example, the power supply device 5 may provide a DC voltage of 24 V at the input terminal 20. The input terminal 20 may be connected to an output terminal 21 via a current path 110, which may act as a fused output terminal. If the switch apparatus 10 were multi-phase, multiple input terminals, multiple current paths, and multiple output terminals would be implemented.

Figure 2:
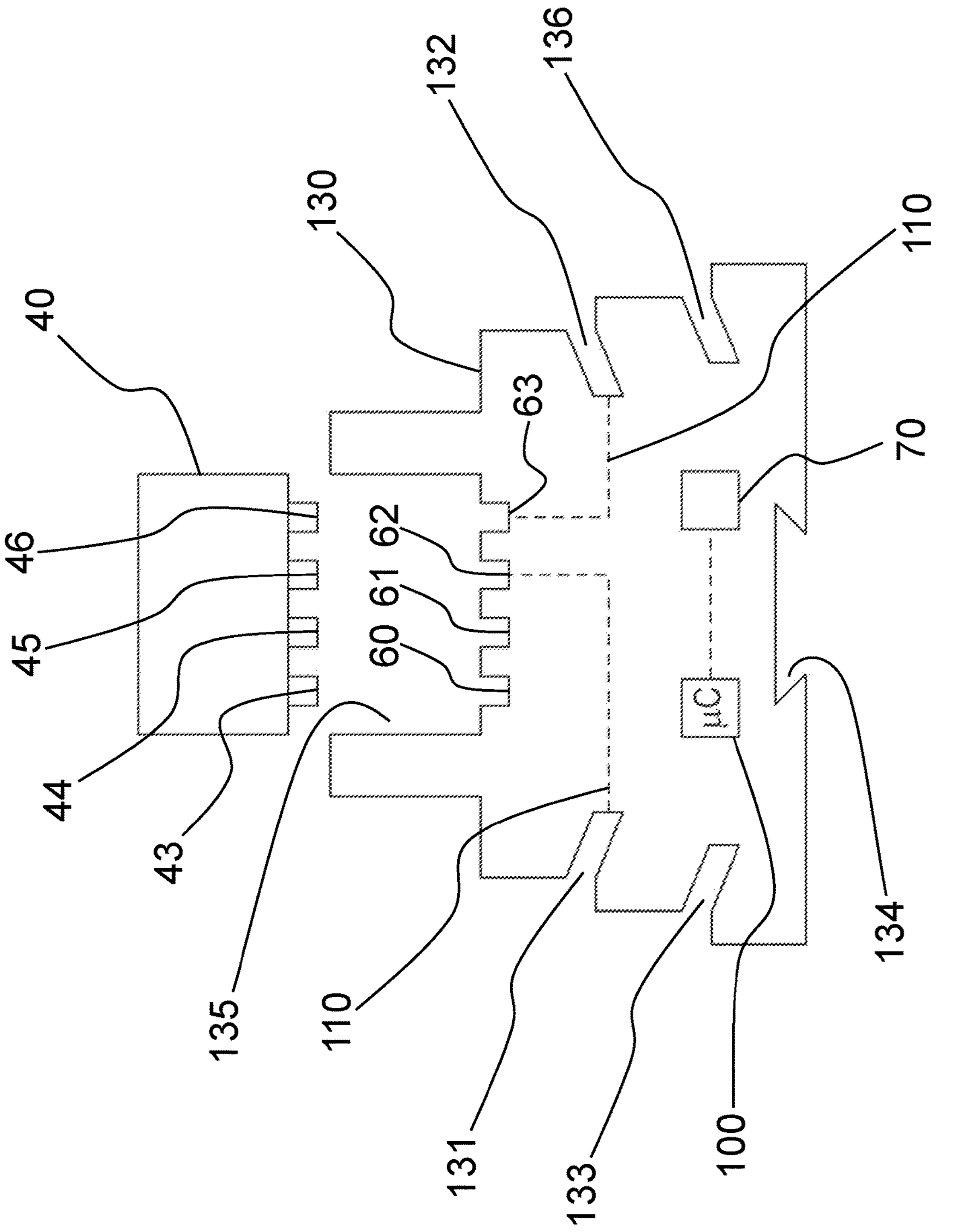
FIG. 2 a housing, in particular a mounting rail housing, in which the switch apparatus is at least partially arranged.

The switch apparatus 10 may further include a manually pluggable relay 40, which includes a coil 42 and a switching element 41. The switching element 41 is preferably implemented as a normally open contact. However, it could also be implemented as a changeover switch. As can be seen in FIG. 2, the exemplary relay 40 has two coil terminals 43 and 44 and two switching element terminals 45 and 46. In the plugged-in state of the relay 40, the switching element 41 is connected in the current path 110. For this purpose, two terminal contacts 62 and 63 are provided in the current path 110, which are electrically connected to the switching element terminals 45 and 46 of the relay 40 in the plugged-in state of the relay 40. In addition, the switch apparatus 10 has two further terminal contacts 60 and 61, which are electrically connected to the two coil terminals 43 and 44 of the relay coil 42 in the plugged-in state of the relay 40. The terminal contact 60 is electrically connected to the input terminal 20. Consequently, in the mated or plugged state of the relay 40, the exemplary DC voltage of 24V is also present at the coil terminal 43. The terminal contacts 60 to 63 are also shown in FIG. 2 in connection with an exemplary housing 130 of the switch apparatus 10. In the plugged-in state of the relay 40, the coil connection 44 of the coil 42 can be connected to ground via the terminal contact 61, for example via a first semiconductor switch 80, which can be actuated by a control and evaluation device 100. The ground is shown as ground terminal 22. The semiconductor switch 80 can be designed, for example, as a field-effect transistor or as a bipolar transistor. In the present example, the semiconductor switch 80 is an npn transistor which has a base terminal 82, a collector terminal 81 electrically connected to the terminal contact 61, and an emitter terminal 83 connected to the ground terminal 22. The base terminal 82 may be connected to an output 101 of the control and evaluation device 100 via a voltage divider comprising, for example, two series-connected electrical resistors 90 and 91. For this purpose, the base terminal 82 may be electrically connected to the contact point connecting the two resistors 90 and 91.

The control and evaluation device 100 is designed, for example, to detect a defective operation of the switch apparatus 10 and, in response thereto, to set the switch apparatus 10 into the second operating state. To detect a fault, for example, a measuring device 50, which is designed in particular to measure a current through the current path 110, can be connected in the current path 110. The control-evaluation device 100 can be designed to detect a defective operation of the switch apparatus 30 in dependence of a measured value received from the measuring device 50. For example, a defective operation may be detected by the control and evaluation device 100 by the current flowing through the current path 110 exceeding a predetermined threshold current value known to the control and evaluation device 100. Furthermore, the manually resettable switch apparatus 10 may comprise a detection device 70, which is preferably electrically connected to an input 102 of the control and evaluation device 100. The detection device 70 is designed to signal to the control and evaluation device 100 whether the relay 40 is plugged or unplugged. The control and evaluation device 100 is further adapted i) to detect whether the relay 40 has been unplugged after a detected defective operation and re-plugged after a predetermined time has elapsed, and if so, ii) to set the switch apparatus 10 into the first operating state, in particular to reset it.

The timing can be monitored by the control and evaluation device 100 with the aid of a timer 105, which can be an integral part of the control and evaluation device 100 or which can be designed as a separate component which can be electrically connected to the control and evaluation device 100, as shown by way of example in FIG. 1.

At this point, it should be noted that the control and evaluation device 100 may be a microcontroller. It should further be noted that the detection device 70 may include a voltage divider having, for example, two electrical resistors 71 and 72 connected in series. Here, one terminal of the electrical resistor 71 may be electrically connected to the terminal contact 61, while one terminal of the resistor 72 may be connected to the ground terminal 22. For example, the contact point connecting the two electrical resistors 71 and 72 is electrically connected to the input 102 of the control and evaluation device 100. In the exemplary switch apparatus 10, in this case the voltage divider 70 is connected in parallel with the semiconductor switch 80 or in parallel with the emitter-collector path of the npn transistor. The power supply to the control and evaluation device 100 may be provided by an internal voltage converter 120, which may transform the DC voltage of, for example, 24 V applied to the input terminal 20 down to a lower DC voltage, for example a DC voltage of 3.3 V, and supply it to the control and evaluation device 100. It should also be noted that an AC voltage can also be applied to the input terminal 20. In this case, the AC voltage is converted by the voltage converter 120 into a DC voltage of 3.3 V, for example.

In particular, the control and evaluation device 100 is designed to switch off the switch apparatus 10 or set it to the second operating state in response to a detected defective operation. For this purpose, the control and evaluation device 10 can cause the relay 40 to be switched off by means of the semiconductor switch 80 or the coil 42 to be de-energized. By this measure, the switching element 41 can be opened, the current path 110 can be interrupted and thus the output terminal 21 can be disconnected from the input terminal 20 to which the supply voltage can be applied. To achieve this, the control and evaluation device 100 can set the output 101 to 0V, thereby driving the transistor 80 into the blocking state.

In order to enable safe disconnection of the output terminal 21 from the input terminal in the event of a fault, a further semiconductor switch 30, which can be actuated by the control and evaluation device 100, can be connected in series with the switching element 41 of the relay 40 into the current path 110. The control and evaluation device 100 can be designed to also open the second semiconductor switch 30 in response to a detected defective operation of the switch apparatus 10. Preferably, the control and evaluation device 100 is designed to first switch the second semiconductor switch 30 in an electrically blocking state or to first open the second semiconductor switch 30 in response to a detected defective operation of the switch apparatus 10, for example, and then to switch off the relay 40 or open the switching element 41 of the relay 40, for example, after a predetermined time has elapsed. The second semiconductor switch 30 can again be implemented, for example, as a field-effect transistor or as a bipolar transistor.

In the normal, i.e. in the first operating state of the switch apparatus 10, the semiconductor switch 80 is closed, so that in the plugged state of the relay 40 the coil 42 has current flowing through it and thus the switching element 41, which functions as a normally open contact by way of example, is closed. This can be achieved by the control and evaluation device 100 providing a voltage of, for example, 3.3 V at the input 101, which ensures that a sufficiently high control voltage is applied via the voltage divider 90, 91 to the base terminal of the semiconductor switch 80, which is designed, for example, as an npn transistor.

The switch apparatus 10 is preferably at least partially arranged in a housing 130. FIG. 2 shows a side view of the housing 130 in the open state. The current path 110, the control and evaluation device 100 and the detection device 70 are shown schematically within the housing 130. The housing 130 may be designed, for example, as a mounting rail housing, such as a terminal block housing, which can be mounted on a mounting rail. For this purpose, corresponding latching elements 134 may be provided on the underside of the housing 130. The overall width of the housing 130 is preferably very narrow, for example less than or equal to 6 mm. The housing 130 can be a plastic housing.

The terminal contacts 60-63 of the switch apparatus 10 may be located on a side of the mounting rail housing 130 opposite the side with the latching elements. The terminal contacts 60 to 63 may be designed as socket contacts to which the coil terminals 43, 44 and the switching element terminals 45, 46 of the relay 40 are electrically connected in the mated state. In this case, the coil terminals and switching element terminals are formed as contact pins. The housing 130 can have a receiving area 135 on the housing side on which the terminal contacts 60 to 63 are located, into which the relay 40 can be inserted. Furthermore, the mounting rail housing 130 shown by way of example in FIG. 2 may have a connection terminal 131, which is electrically connected to the input terminal 20 of the switch apparatus or forms the input connection 20. A further terminal 132 may be electrically connected to the output terminal 21 of the switch apparatus 10, or may form the output terminal 21. A further connection terminal 133 may form the ground terminal 22 of the switch apparatus 10. Another connection terminal 136 may also function as the ground terminal. The power supply device 5 shown in FIG. 1 may be connected to the connection terminals 131 and 133, while an electrical or electronic load may be connected to the connection terminals 132 and 136.

The mode of operation of the manually resettable switch apparatus 10 shown as an example in FIG. 1 is explained in more detail below.

First, assume that the switch apparatus 10 is operating in a fault-free mode. This means that the control and evaluation device 100 provides corresponding control signals for the semiconductor switches 30 and 80, which cause the semiconductor switches 30 and 80 to be closed and conductive, respectively. The conductive semiconductor switch 80, in turn, causes current to flow through the coil 41 of the relay 40 and consequently causes the switching element 41 of the relay 40 to also be closed. In this way, the current path 110 is switched through between the input terminal 20 and the output terminal 21. This corresponds to the first operating state of the switch apparatus 10.

Now, by way of example, assume that the measuring device 50 has measured a current in the current path 110 that is greater than or equal to a predetermined threshold value. The measured current value is supplied to the control and evaluation device 100, which detects a defective operation of the switch apparatus 10 in dependence of the measured current. In response to the detected defective operation, the control and evaluation device 100 provides at its outputs 103 and 101, for example with a time delay, corresponding control signals for the semiconductor switches 30 and 80, which have the effect that first the semiconductor switch 30 is opened or switched to the blocking state, and then the semiconductor switch 80 is controlled to the blocking or opened state. For this purpose, a control voltage of 0V can be applied to each of the two outputs 101 and 103, for example. If the semiconductor switch 80 is switched to the blocking state, the result is that the input voltage of, for example, 24 V present at the terminal contact 60 or at the coil terminal 43 also appears at the terminal contact 61 or at the coil terminal 44, whereupon the coil 42 is de-energized, i.e. switched off. In other words, the relay 40 drops out and the switching element 41 also opens the current path 110. The switch apparatus 10 is thus switched off or is in its second operating state. Consequently, the second operating state is characterized in particular by the fact that the output terminal 21 is electrically isolated from the input terminal 20.

The switch apparatus 10 now expects a manual reset, i.e. a renewed start-up and thus a reset or resetting of the switch apparatus 10 to the first operating state. This can be achieved, for example, by the customer pulling or unplugging the relay 40 out of the switch apparatus 10 or the housing 130 and re-plugging it after a predetermined period of time has elapsed. This behavior can be monitored and detected by the control and evaluation device 100 in conjunction with the detection device 70 and the timer 105. This is explained in more detail below by way of example.

As already explained above, the control and evaluation device 100 is designed to ensure, in response to a detected fault condition, that, if present, the semiconductor switch 30 is opened or controlled into the blocking state and subsequently the semiconductor switch 80 is opened or controlled into the blocking state, so that the input voltage is also present at the coil terminal 44. This state is detected by the detection device 70, which is formed by the voltage divider 71 and 72, for example, and is applied as a high level to the input 102 of the control and evaluation device 100. In order to be able to reset the switch apparatus 10 again, the control and evaluation device 100 now expects the relay 40 to be unplugged and, after the predetermined time has elapsed, to be plugged in again.

If the customer now pulls the relay 40, the potential at the terminal contact 61 drops to 0 V, which in turn is detected by the voltage divider or the detection device 70 and signaled as a low level at the input 102 of the control and evaluation device 100. In response to this level change at the input 102 of the control and evaluation device 100, the timer 105, which can also be an integral component of the control and evaluation device 100, is started, whereby the predetermined time now elapse. After the predetermined time has expired, the control and evaluation device 100 expects that a high level is again applied to the input 102, signaling that the relay has been re-plugged. Assume now that the customer has re-inserted the relay 40 into the switch apparatus 10 or housing 130 after the predetermined time has elapsed. Consequently, the voltage present at the input terminal 20 is again present at the terminal contact 61. The level change from low to high at the terminal contact 61 is detected by the detection device 70 and applied again as a high level to the input 102 of the control and evaluation device 100. In response to the level change from low to high at the input 102, the control and evaluation device 100 provides corresponding control signals for the semiconductor switches 30 and 80 at its outputs 103 and 101, which cause the semiconductor switches 30 and 80 to be closed again or controlled to their conductive state. The closed semiconductor 80 causes a current to flow through the coil 42 again, thereby causing the switching element 41 to close the current path 110 again. In other words: After the switch apparatus 10 is reset into the first operating state, the current path 110 is closed again by means of the semiconductor switch 30 and the switching element 41 of the relay 40, and thus the input terminal 20 is electrically connected to the output terminal 21. It should be noted that the semiconductor switch 30 is not required for proper operation of the switch apparatus 10.

At least some of the exemplary aspects explained above are summarized below.

According to an exemplary aspect, a manually resettable switch apparatus 10 is provided that is controllable into a first or a second operating state. The switch apparatus 10 may have the following features:

a current path 110 having an input terminal 20, to which an input voltage can be applied, and having an output terminal 21, a manually pluggable relay 40 having a coil 42 and a switching element 41, which is connected in the current path 110 when the relay 40 is in the plugged-in state, a control and evaluation device 100, which is designed to detect a defective operation of the switch apparatus 10 and, in response thereto, to set the switch apparatus 10 to the second operating state, a detection device 70 which is electrically connected to the control and evaluation device 100 and which is designed to signal to the control and evaluation device 100 whether the relay 40 is plugged in or unplugged, wherein the control and evaluation device 100 is further designed i) to detect whether the relay 40 has been unplugged after a detected defective operation and has been plugged in again after a predetermined time has elapsed, and if so, ii) to set the switch apparatus 10 to the first operating state.

Advantageously, the switch apparatus can have a first semiconductor switch 80, which can be actuated by the control and evaluation device 100, wherein the control and evaluation device 100 is designed to de-energize the coil 42 of the relay 40 by means of the semiconductor switch 80 in response to a detected defective operation.

Advantageously, the first semiconductor switch 80 is connected in parallel with the detection device 70, whereby the first semiconductor switch 80 and the detection device 70 can be connected in series with the coil 42 when the relay 40 is plugged in.

Advantageously, the detection device 70 may include a voltage divider, which may, for example, include two series-connected electrical resistors 71 and 72.

Advantageously, the switch apparatus can have a second semiconductor switch 30, which can be controlled by the control and evaluation device 100 and which is connected in series with the switching element 41 of the relay 40 in the current path 110, wherein the control and evaluation device 100 can be designed to open the second semiconductor switch 30 or to control it into a blocking state in response to a detected defective operation.

In order to be able to detect a defective operation of the switch apparatus 10, a fault detection device, for example a measuring device 50, which is designed to measure a current through the current path 10, can be implemented in the switch apparatus 10, wherein the control and evaluation device 100 is designed to detect a defective operation in response to the measurement result of the measuring device 50.

Advantageously, the switch apparatus 10 can have a housing 130, in particular a mounting rail housing, in which, among other things, the current path 110, the control and evaluation device 100 and the detection device 70 can be arranged, wherein the housing 130 and the relay 40 can each be designed for mechanical and electrical coupling to one another.

In the mated or plug-in state of the relay 40, a first coil terminal 43 may be electrically connected to the input terminal 20 and a second coil terminal 44 may be electrically connected to the detection device 70.

Preferably, the switch apparatus 10 may include a timer 105 associated with the control and evaluation device 100 and configured to start the timing of the predetermined time in response to the pulling or unplugging of the relay 40, wherein the control and evaluation device 100 may be configured i) to detect when the predetermined time has elapsed, and ii) to set the switch apparatus 10 to the first operating state in response to the elapsed predetermined time, wherein in the first operating state the output terminal 21 is electrically connected to the input terminal 20.

The invention claimed is:

1. A manually resettable switch apparatus, which is controllable into a first or a second operating state, comprising:

a current path having an input terminal to which an input voltage can be applied, and an output terminal, a manually pluggable relay having a coil, and a switching element which is connected in the current path when the relay is in a plugged state, a control and evaluation device designed to detect defective operation of the switch apparatus and, in response thereto, to set the switch apparatus into the second operating state, and a detection device electrically connected to the control and evaluation device and designed to signal to the control and evaluation device whether the relay is plugged in or unplugged, wherein the control and evaluation device is further designed:

i) to recognize whether the relay has been unplugged after a detected defective operation and has been plugged in again after expiration of a predetermined time, and ii) after recognizing that the relay has been unplugged after a detected defective operation and has been plugged in again after expiration of a predetermined time, to set the switch apparatus into the first operating state.

2. The switch apparatus according to claim 1, further comprising:

a first semiconductor switch which can be actuated by the control and evaluation device, wherein:

the control and evaluation device is designed to de-energize the coil of the relay by means of the semiconductor switch in response to a detected defective operation.

3. The switch apparatus according to claim 2, wherein:

the first semiconductor switch is connected in parallel with the detection device, and in the plugged state of the relay the first semiconductor switch and the detection device are connected in series with the coil.

4. The switch apparatus according to claim 1, wherein:

the detection device has a voltage divider.

5. The switch apparatus according to one claim 1, further comprising:

a second semiconductor switch which can be actuated by the control and evaluation device and which is connected in series with the switching element of the relay in the current path, wherein:

the control and evaluation device is designed to open the second semiconductor switch in response to a detected defective operation.

6. The switch apparatus according to claim 1, further comprising:

a measuring device which is designed to measure a current through the current path, wherein:

the control and evaluation device is designed to detect a defective operation in response to the measurement result of the measuring device.

7. The switch apparatus according to claim 1, wherein:

the switch apparatus has a housing, in particular a mounting rail housing, in which the current path, the control and evaluation device and the detection device are arranged, and the housing and the relay are each designed for mechanical and electrical coupling to one another.

8. The switch apparatus according to claim 1, wherein:

in the plugged-in state of the relay, a first coil terminal is electrically connected to the input terminal and a second coil terminal is electrically connected to the detection device.

9. The switch apparatus according to claim 1, further comprising:

a timer assigned to the control and evaluation device and designed to start elapsing of the predetermined time in response to the unplugging of the relay, wherein the control and evaluation device is designed:

i) to detect when the predetermined time has elapsed, and ii) to set the switch apparatus to the first operating state in response to the elapsed predetermined time, wherein in the first operating state the output terminal is electrically connected to the input terminal.

* * * * *